(12) United States Patent
Yerrabommanahalli et al.

(10) Patent No.: US 8,903,370 B2
(45) Date of Patent: Dec. 2, 2014

(54) NETWORK ACCESS CREDENTIAL MIGRATION

(71) Applicant: Apple Inc., Cupertino, CA (US)

(72) Inventors: Vikram B. Yerrabommanahalli, Sunnyvale, CA (US); Prashant H. Vashi, Sunnyvale, CA (US); Cesar Perez, Sunnyvale, CA (US)

( * ) Notice: Subject to any disclaimer, the term of this patent is extended or adjusted under 35 U.S.C. 154(b) by 116 days.

(21) Appl. No.: 13/647,380

(22) Filed: Oct. 8, 2012

(65) Prior Publication Data

US 2014/0099933 A1  Apr. 10, 2014

(51) Int. Cl.
*H04M 3/00* (2006.01)

(52) U.S. Cl.
USPC .......................................................... 455/418

(58) Field of Classification Search
CPC ........................... H04W 12/06; H04L 2209/80
USPC ........... 455/419, 414.1, 435.1, 411, 435, 558, 455/435.2; 370/259, 352, 331, 466
See application file for complete search history.

(56) References Cited

U.S. PATENT DOCUMENTS

| | | | |
|---|---|---|---|
| 8,244,223 B2* | 8/2012 | Farah | 455/414.1 |
| 2002/0094808 A1* | 7/2002 | Tiedemann et al. | 455/419 |
| 2006/0234676 A1 | 10/2006 | Harris et al. | |
| 2011/0191835 A1 | 8/2011 | Hawkes et al. | |
| 2012/0221695 A1* | 8/2012 | Rose et al. | 709/223 |

FOREIGN PATENT DOCUMENTS

| | | |
|---|---|---|
| WO | WO 2010/138333 A1 | 12/2010 |
| WO | WO 2012/037161 A2 | 3/2012 |

* cited by examiner

*Primary Examiner* — Kiet Doan
(74) *Attorney, Agent, or Firm* — Womble Carlyle Sandridge & Rice, LLP (57) ABSTRACT

A method for network access credential migration is provided. The method can include deprovisioning a network access credential for a wireless network from a first wireless communication device. The method can further include determining that the network access credential has been successfully deprovisioned from the first wireless communication device. The method can additionally include provisioning the network access credential to the second wireless communication device after the network access credential has been successfully deprovisioned from the first wireless communication device.

19 Claims, 7 Drawing Sheets

102
First
Wireless
Communication
Device

104
Second
Wireless
Communication
Device

NETWORK ACCESS CREDENTIAL MIGRATION

FIELD OF THE DESCRIBED EMBODIMENTS

The described embodiments relate generally to wireless communications and more particularly to network access credential migration.

BACKGROUND

Cellular network subscribers often upgrade their wireless communication devices. When a cellular network subscriber upgrades his or her wireless communication device, a network access credential associated with the subscriber's account can be provisioned to the subscriber's new wireless communication device. In many instances, a copy of the network access credential that is provisioned to the subscriber's new device can remain on the old device. When a device is provisioned with a network access credential, it can attempt to connect to a cellular network using the network access credential. As such, if a subscriber's old device is powered on, it can attempt to connect to the cellular network using a network access credential associated with the subscriber's account, even though the subscriber's new device can be connected to the cellular network using the same network access credential. In such situations, collisions can result in which both the subscriber's old device and new device can respond to a page for an incoming communication, such as a phone call, text message, or the like. The first device to respond to the page can receive the communication, even if it is the subscriber's old device that first responds to the page. Accordingly, communications can be missed by a subscriber in such collision scenarios if he or she expects them to be received by his or her new device.

Many subscribers wish to continue to use their old devices for functions other than connecting to the cellular network. For example, some subscribers may use their old devices to connect to wireless local area networks (WLANs) to surf the Internet and check email, to play mobile games, to take pictures, and/or perform other non-cellular functions of which various wireless communication devices can be capable. Accordingly, subscribers who have upgraded their devices and wish to continue using their old devices can be plagued by collisions between their old and new devices.

SUMMARY OF THE DESCRIBED EMBODIMENTS

Some embodiments disclosed herein provide for network access credential migration in a manner that avoids collisions between devices even if a subscriber continues to use his or her old device following migration of the subscriber's account to a new device. In this regard, some example embodiments provide for deprovisioning of a network access credential for a wireless network from a first wireless communication device before the network access credential is migrated to a second wireless communication device. Deprovisioning of the network access credential form the first wireless communication device in accordance with some such embodiments can render the network access credential unreadable by the first wireless communication device. Accordingly, the first wireless communication device may not use the network access credential to attempt to connect to the wireless network, even if it is powered on and within range of the wireless network, and collisions between the first wireless communication device and the second wireless communication device can be avoided.

In a first embodiment, a method is provided. The method of the first embodiment can include deprovisioning a network access credential for a wireless network from a first wireless communication device; determining that the network access credential has been successfully deprovisioned from the first wireless communication device; and provisioning the network access credential to a second wireless communication device after the network access credential has been successfully deprovisioned from the first wireless communication device so that the network access credential is migrated from the first wireless communication device to the second wireless communication device.

In a second embodiment, an apparatus comprising processing circuitry is provided. The processing circuitry can be configured to control the apparatus of the second embodiment to deprovision a network access credential for a wireless network from a first wireless communication device; determine that the network access credential has been successfully deprovisioned from the first wireless communication device; and provision the network access credential to a second wireless communication device after the network access credential has been successfully deprovisioned from the first wireless communication device so that the network access credential is migrated from the first wireless communication device to the second wireless communication device.

In a third embodiment, a computer program product is provided. The computer program product of the third embodiment can include at least one non-transitory computer readable storage medium having program code stored thereon. The program code can include program code for deprovisioning a network access credential for a wireless network from a first wireless communication device; program code for determining that the network access credential has been successfully deprovisioned from the first wireless communication device; and program code for provisioning the network access credential to a second wireless communication device after the network access credential has been successfully deprovisioned from the first wireless communication device so that the network access credential is migrated from the first wireless communication device to the second wireless communication device.

In a fourth embodiment, an apparatus is provided that can include means for deprovisioning a network access credential for a wireless network from a first wireless communication device; means for determining that the network access credential has been successfully deprovisioned from the first wireless communication device; and means for provisioning the network access credential to a second wireless communication device after the network access credential has been successfully deprovisioned from the first wireless communication device so that the network access credential is migrated from the first wireless communication device to the second wireless communication device.

In a fifth embodiment, a method is provided. The method of the fifth embodiment can include receiving, at a first wireless communication device, a deprovisioning command sent by a provisioning entity. A network access credential for a wireless network that is to be migrated from the first wireless communication device to a second wireless communication device can be deprovisioned from the first wireless communication device based at least in part on the deprovisioning command. The method of the fifth embodiment can further include receiving a predefined credential provisioned to the first wireless communication device by the provisioning entity after the network access credential has been deprovisioned from the wireless communication device; recognizing the predefined credential; and, in response to the predefined credential, barring connection to the wireless network.

In a sixth embodiment, a wireless communication device is provided. The wireless communication device of the sixth embodiment can include a transceiver and processing circuitry coupled to the transceiver. The transceiver can be configured to transmit data to and receive data from a wireless network. The processing circuitry can be configured to control the wireless communication device to at least receive a deprovisioning command sent by a provisioning entity. A network access credential for the wireless network that is to be migrated from the wireless communication device to a second wireless communication device can be deprovisioned from the wireless communication device based at least in part on the deprovisioning command. The processing circuitry can be further configured to control the wireless communication device to receive a predefined credential provisioned to the wireless communication device by the provisioning entity after the network access credential has been deprovisioned from the wireless communication device; recognize the predefined credential; and in response to the predefined credential, bar connection to the wireless network.

In a seventh embodiment, a computer program product is provided. The computer program product of the seventh embodiment can include at least one non-transitory computer readable storage medium having program code stored thereon. The program code can include program code for receiving, at a first wireless communication device, a deprovisioning command sent by a provisioning entity. A network access credential for a wireless network that is to be migrated from the first wireless communication device to a second wireless communication device can be deprovisioned from the first wireless communication device based at least in part on the deprovisioning command. The program code can further include program code for receiving a predefined credential provisioned to the first wireless communication device by the provisioning entity after the network access credential has been deprovisioned from the wireless communication device; program code for recognizing the predefined credential; and program code for, in response to the predefined credential, barring connection to the wireless network.

In an eighth embodiment, an apparatus is provided that can include means for receiving, at a first wireless communication device, a deprovisioning command sent by a provisioning entity. A network access credential for a wireless network that is to be migrated from the first wireless communication device to a second wireless communication device can be deprovisioned from the first wireless communication device based at least in part on the deprovisioning command. The apparatus of the eighth embodiment can further include means for receiving a predefined credential provisioned to the first wireless communication device by the provisioning entity after the network access credential has been deprovisioned from the wireless communication device; means for recognizing the predefined credential; and means for, in response to the predefined credential, barring connection to the wireless network.

The above summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some embodiments disclosed herein provide for migration of a network access credential for a wireless network from a first wireless communication device to a second wireless communication device in a manner that prevents collisions. In this regard, the network access credential can be deprovisioned from the first wireless communication device prior to being provisioned to the second wireless communication device. Accordingly, even if a subscriber continues to use the first wireless communication device after the network access credential associated with his or her account has been migrated to the second wireless communication device, the first wireless communication device will not connect to the wireless network using the network access credential. Accordingly, collisions between the first wireless communication device and the second wireless communication device can be avoided.

Further, in some example embodiments, the first wireless communication device can be provisioned with a predefined credential as part of the network access credential migration procedure. The first wireless communication device of such example embodiments can be configured to recognize the predefined credential and can be configured to bar connection to the wireless network in response to being provisioned with the predefined credential. As such, even if the subscriber continues to use the first wireless communication device for other purposes, both the first wireless communication device and the wireless network can avoid wasting resources and incurring overhead from processing registration and connection attempts.

Figure 1:
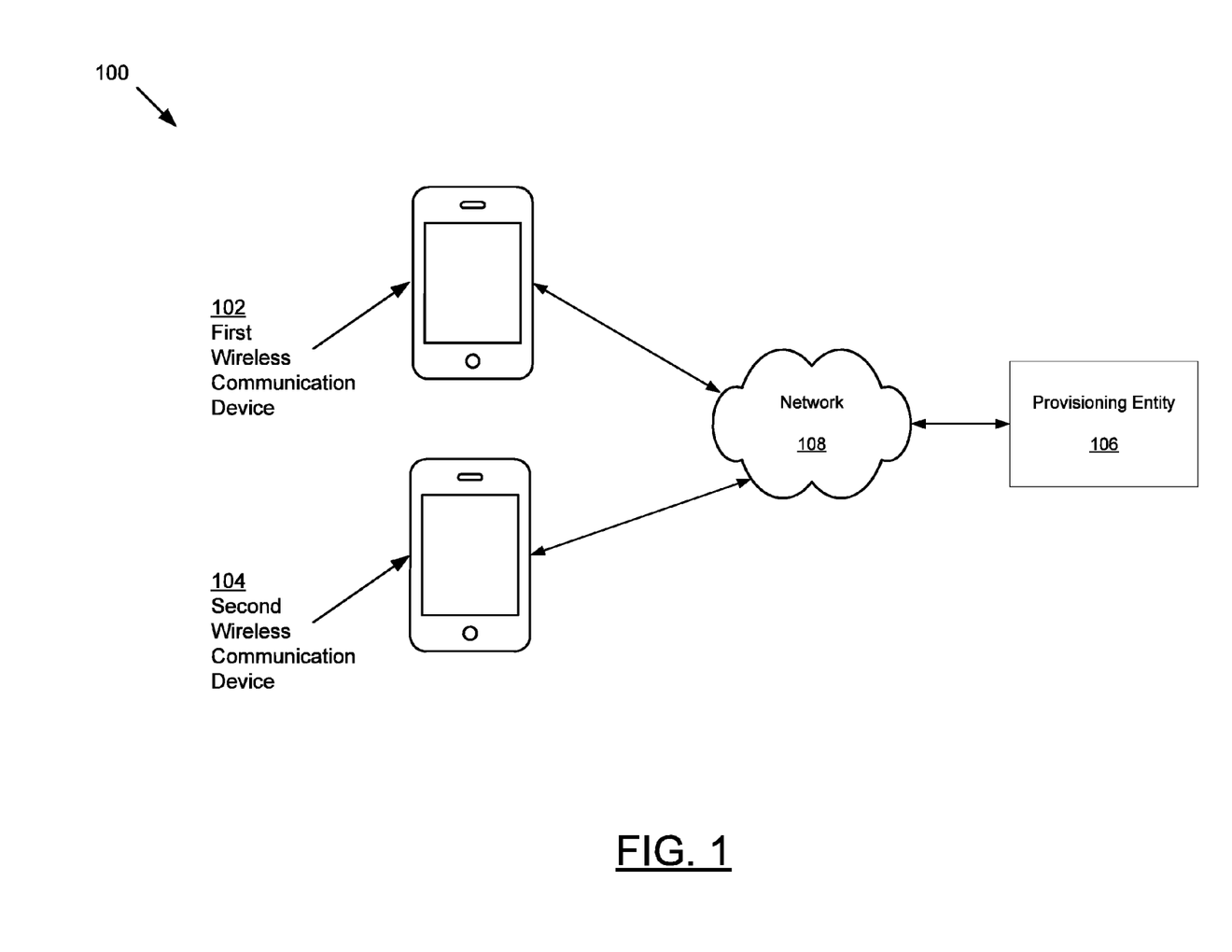
FIG. 1 illustrates a system for network access credential migration in accordance with some example embodiments.

FIG. 1 illustrates a system 100 for network access credential migration in accordance with some example embodiments. The system 100 can include a first wireless communication device 102 and second wireless communication device 104. The wireless communication devices 102 and 104 can each be a cellular phone, such as a smart phone device, a tablet computing device, a laptop computing device, or other computing device configured to operate within a wireless network, such as by way of non-limiting example a cellular network, for which a user can have an account and associated network access credential that can be provisioned to the user's device to enable the device to access the wireless network.

The first wireless communication device 102 can initially have a network access credential that was provisioned to the first wireless communication device to enable the first wireless communication device to access a wireless network. As will be described further herein below, the network access credential can be migrated to the second wireless communication device 104 in accordance with one or more example embodiments. In this regard, a network user can request that his or her account be migrated from the first wireless communication device 102 to the second wireless communication device 104, such as in a scenario in which the user may upgrade from the first wireless communication device 102 to the second wireless communication device 104.

The network access credential can be any credential that can be uniquely associated with the user's wireless network account, and which can enable a device to access the wireless network. By way of non-limiting example, the network access credential can include one or more of an International Mobile Subscriber Identity (IMSI), a Mobile Subscription Identification Number (MSIN), a Mobile Identification Number (MIN), a Mobile Directory Number (MDN), a network authentication key, a Subscriber Identity Module (SIM) application, or a Universal Subscriber Identity Module (USIM) application.

The system 100 can further include a provisioning entity 106. The provisioning entity 106 can be any entity that can be configured to manage provisioning of network access credentials for accessing a wireless network. By way of non-limiting example, the provisioning entity 106 can be embodied as one or more of an Over-the-Air Service Provisioning (OTASP) entity, an Over-the-Air Parameter Administration (OTAPA) entity, an Over-the-Air (OTA) Subscriber Identity Module (SIM) provisioning entity, or the like. The provisioning entity 106 can be embodied as one or more computing devices. By way of non-limiting example, the provisioning entity 106 can be embodied as one or more servers, a distributed computing device, or the like. In some example embodiments, the provisioning entity 106 can be managed by a network carrier to facilitate provisioning and management of network access credentials for network users.

As will be described further herein below, the provisioning entity 106 can be configured in some example embodiments to deprovision a network access credential from the first wireless communication device 102 and to provision the network access credential to the second wireless communication device 104 in order to facilitate migration of the network access credential from the first wireless communication device 102 to the second wireless communication device 104. In this regard, the provisioning entity 106 can be configured to interface with the first wireless communication device 102 and second wireless communication device 104. For example, the provisioning entity 106 can be configured to interface with the first wireless communication device 102 and/or second wireless communication device 104 via a network 108. The network 108 can be embodied as one or more wireline networks, one or more wireless networks (e.g., one or more cellular networks, one or more WLANs, one or more wireless metropolitan area networks, and/or the like), or some combination thereof, and in some example embodiments, can include the Internet. In some example embodiments, the network 108 can include the wireless network for which the network access credential to be migrated from the first wireless communication device 102 to the second wireless communication device 104 provides access.

Although illustrated in FIG. 1 as interfacing over the network 108, in some example embodiments, one or more of the first wireless communication device 102 or the second wireless communication device 104 can be configured to interface with the provisioning entity 106 via a direct connection. For example, a wired connection, such as a universal serial bus (USB) connection, FireWire connection, and/or the like can be used in some example embodiments to interface the provisioning entity 106 with one or more of the first wireless communication device 102 or the second wireless communication device 104. As another example, a wireless location, such as a Bluetooth connection, ZigBee connection, wireless USB connection, or the like can be used to interface the provisioning entity 106 with one or more of the first wireless communication device 102 or the second wireless communication device 104 in some example embodiments.

Figure 2:
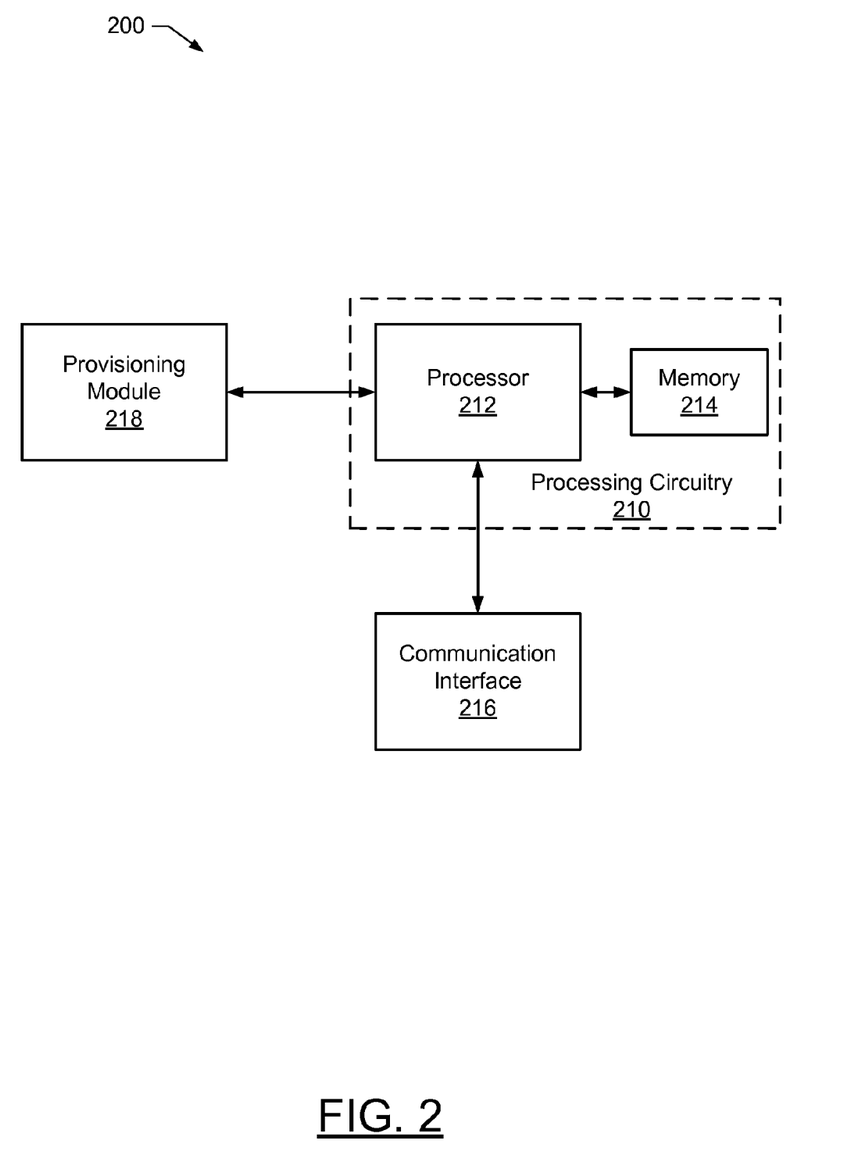
FIG. 2 illustrates a block diagram of an apparatus that can be implemented on a provisioning entity in accordance with some example embodiments.

FIG. 2 illustrates a block diagram of an apparatus 200 that can be implemented on the provisioning apparatus 106 in accordance with some example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the provisioning apparatus 106 can include processing circuitry 210 that is configurable to perform actions in accordance with one or more example embodiments disclosed herein. In this regard, the processing circuitry 210 can be configured to perform and/or control performance of one or more functionalities of the provisioning apparatus 106 in accordance with various example embodiments, and thus can provide means for performing functionalities of the provisioning apparatus 106 in accordance with various example embodiments. The processing circuitry 210 can be configured to perform data processing, application execution and/or other processing and management services according to one or more example embodiments.

In some embodiments, the provisioning apparatus 106 or a portion(s) or component(s) thereof, such as the processing circuitry 210, can include one or more chipsets, which can each include one or more chips. The processing circuitry 210 and/or one or more further components of the provisioning apparatus 106 can therefore, in some instances, be configured to implement an embodiment on a chipset.

In some example embodiments, the processing circuitry 210 can include a processor 212 and, in some embodiments, such as that illustrated in FIG. 2, can further include memory 214. The processing circuitry 210 can be in communication with or otherwise control a communication interface 216 and/or provisioning module 218.

The processor 212 can be embodied in a variety of forms. For example, the processor 212 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the provisioning apparatus 106 as described herein. In embodiments including a plurality of processors, the processors can be implemented on a single computing device, or can be distributed across a plurality of computing devices that can be collectively configured to provide functionality of the provisioning apparatus 106 in accordance with some example embodiments. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. In embodiments including multiple memory devices, the memory devices can be implemented on a single computing device, or can be distributed across a plurality of computing devices that can be collectively configured to provide functionality of the provisioning apparatus 106 in accordance with some example embodiments. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the provisioning apparatus 106 to carry out various functions in accordance with one or more example embodiments. In some embodiments, the memory 214 can be in communication with one or more of the processor 212, communication interface 216, or provisioning module 218 via a bus(es) for passing information among components of the provisioning apparatus 106.

The provisioning apparatus 106 can further include a communication interface 216. The communication interface 216 can enable the provisioning apparatus 106 to communicate with the first wireless communication device 102 and second wireless communication device 104. In this regard, the communication interface 216 can include one or more interface mechanisms for enabling communication with other devices and/or networks. As such, the communication interface 216 can include, for example, an antenna (or multiple antennas) and supporting hardware and/or software for enabling communications with a wireless communication network (e.g., a cellular network, WLAN, and/or the like) and/or a communication modem or other hardware/software for supporting communication via cable, digital subscriber line (DSL), USB, FireWire, Ethernet or other wireline networking methods. Additionally or alternatively, the communication interface 216 can support communication with a device via a wireless connection, such as a Bluetooth connection, ZigBee connection, wireless USB connection, and/or the like.

The provisioning apparatus 106 can further include provisioning module 218. The provisioning module 218 can be embodied as various means, such as circuitry, hardware, a computer program product comprising computer readable program instructions stored on a computer readable medium (for example, the memory 214) and executed by a processing device (for example, the processor 212), or some combination thereof. In some embodiments, the processor 212 (or the processing circuitry 210) can include, or otherwise control the provisioning module 218.

Figure 3:
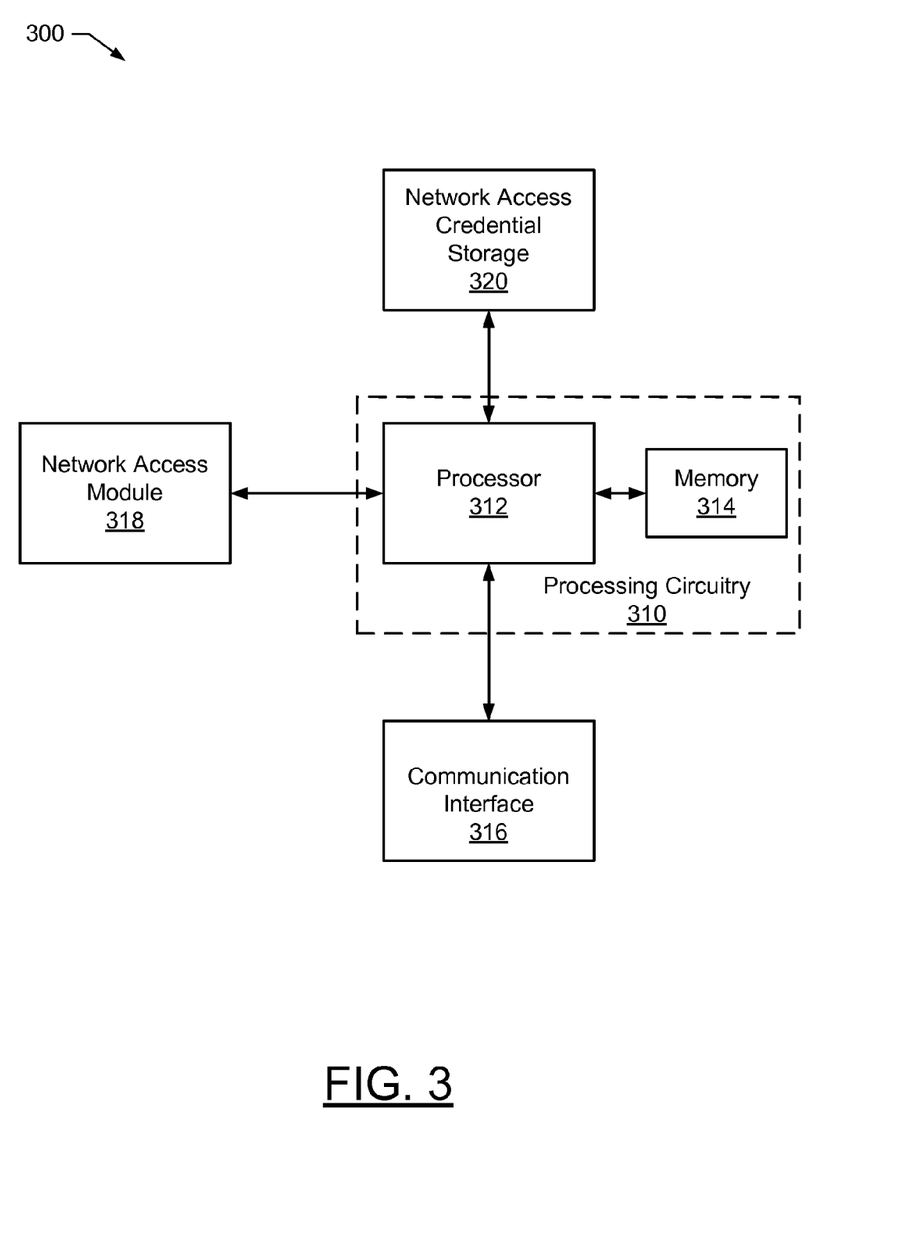
FIG. 3 illustrates a block diagram of an apparatus that can be implemented on a wireless communication device in accordance with some example embodiments.

FIG. 3 illustrates a block diagram of an apparatus 300 that can be implemented on a wireless communication device, such as the first wireless communication device 102 and/or second wireless communication device 104 in accordance with some example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the apparatus 300 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a chipset. In some example embodiments in which one or more components of the apparatus 300 are embodied as a chipset, the chipset can be capable of enabling a computing device to operate in a wireless network, such as a cellular network.

In some example embodiments, the processing circuitry 310 can include a processor 312 and, in some embodiments, such as that illustrated in FIG. 3, can further include memory 314. The processing circuitry 310 can be in communication with or otherwise control a communication interface 316 and/or network access module 318. The processing circuitry 310 can further include or be in communication with network access credential storage 320.

The processor 312 can be embodied in a variety of forms. For example, the processor 312 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 as described herein. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, communication interface 316, network access module 318, or network access credential storage 320 via a bus(es) for passing information among components of the apparatus 300.

The apparatus 300 can further include communication interface 316. The communication interface 316 can enable a wireless communication device, such as the first wireless communication device 102 and/or second wireless communication device 104 to communicate with other devices and/or networks. As such, the communication interface 216 can include, for example, a transceiver(s) and supporting hardware and/or software for enabling communications with a wireless communication network (e.g., a cellular network, WLAN, and/or the like) and/or a communication modem or other hardware/software for supporting communication via cable, digital subscriber line (DSL), USB, FireWire, Ethernet or other wireline networking methods. Additionally or alternatively, the communication interface 216 can support communication with a device via a direct wireless connection, such as a Bluetooth connection, ZigBee connection, wireless USB connection, and/or the like. As such, the communication interface 316 can be configured to enable a wireless communication device to access the network 108 and/or otherwise interface with the provisioning entity 106.

The apparatus 300 can further include network access module 318. The network access module 318 can be embodied as various means, such as circuitry, hardware, a computer program product comprising computer readable program instructions stored on a computer readable medium (for example, the memory 314) and executed by a processing device (for example, the processor 312), or some combination thereof. In some embodiments, the processor 312 (or the processing circuitry 310) can include, or otherwise control the network access module 318.

The network access credential storage 320 can provide memory for storage of a network access credential that can be provisioned by the provisioning entity 106. In some example embodiments, the network access credential storage 320 can be implemented on memory 314, which can provide memory space for network access credential storage. Alternatively, in some example embodiments, network access credential storage 320 can be implemented as dedicated hardware for network access credential storage. For example, in some such embodiments, network access credential storage 320 can be SIM hardware (e.g., a SIM card). In some example embodiments, network access credential storage 320 can provide for secure storage of a network access credential.

The provisioning module 218 of some example embodiments can be configured to migrate a network access credential form the first wireless communication device 102 to the second wireless communication device 104. The migration procedure can be initiated in response to a request that can be received by the provisioning entity 106. The request can be initiated by a network subscriber. For example, a wireless network subscriber can call a network operator or other service provider and/or visit a physical service provider location and request that his or her account be migrated from the first wireless communication device 102 to the second wireless communication device 104. The service provider can in turn initiate a request to the provisioning entity 106 to perform an account migration procedure. As another example, the subscriber can use an application, web page form, or other form of electronic communication to request that the provisioning entity 106 migrate his or her account from the first wireless communication device 102 to the second wireless communication device 104.

The provisioning module 218 can respond to a request to migrate a subscriber account from the first wireless communication device 102 to the second wireless communication device 104 by first deprovisioning the network access credential associated with the account from the first wireless communication device 102. Deprovisioning the network access credential from the first wireless communication device 102 can include erasing the network access credential from the network access credential storage 320 or otherwise rendering the network access credential unreadable by the first wireless communication device 102. Thus, for example, if SIM hardware (e.g., a SIM card) is implemented on the first wireless communication device 102, the network access credential can be deprovisioned from the SIM hardware In some example embodiments, the provisioning module 218 can be configured to cause the provisioning entity to send a deprovisioning command to the first wireless communication device 102 in order to deprovision the network access credential form the first wireless communication device 102. In some such embodiments, the deprovisioning command can directly deprovision the network access credential from the first wireless communication device 102. For example, the deprovisioning command can be formatted in accordance with a device management protocol, such as by way of non-limiting example, Open Mobile Alliance (OMA) Device Management (DM) protocol or the like, which can enable the provisioning entity 106 to directly manage network access credentials on a wireless communication device. Alternatively, in some example embodiments, the deprovisioning command can be a command that can be recognized by the first wireless communication device 102, and the first wireless communication device 102 can erase the network access credential form the network access credential storage 320 in response to the command The provisioning module 218 can be further configured to determine (e.g., verify) that the network access credential has been successfully deprovisioned from the first wireless communication device 102. After the network access credential has been successfully deprovisioned from the first wireless communication device 102, the provisioning module 218 can provision the network access credential to the second wireless communication device 104. As such, by first successfully deprovisioning the network access credential from the first wireless communication device 102 prior to provisioning the network access credential to the second wireless communication device 104, the existence of instances of the network access credentials on multiple devices and the potential for collisions can be avoided. Further, the first wireless communication device 102 of some such example embodiments may not even attempt to connect to the wireless network after being deprovisioned since it may no longer have access to a readable network access credential for accessing the network.

In provisioning the network access credential to the second wireless communication device 104, the provisioning module 218 can provide the network access credential to the second wireless communication device 104 such that it is stored on a network access credential storage 320 that can be implemented on the second wireless communication device 104. Thus, for example, if SIM hardware (e.g., a SIM card) is implemented on the second wireless communication device 104, the network access credential can be provisioned to the SIM hardware.

In some example embodiments, deprovisioning of the network access credential from the first wireless communication device 102 can be performed via an over-the-air (OTA) interface with the first wireless communication device 102. Additionally or alternatively, provisioning of the network access credential to the second wireless communication device 104 can be performed via an over-the-air (OTA) interface with the second wireless communication device 104. In this regard, for example, in embodiments in which the first wireless communication device 102 and/or second wireless communication device 104 are connected to the wireless network which the network access credential is used to access during the migration procedure, OTA management techniques can be used for deprovisioning the first wireless communication device 102 and/or provisioning the second wireless communication device 104. By way of non-limiting example, deprovisioning and/or provisioning can be performed using OMADM, OTASP, Bearer Independent Protocol (BIP), and/or other protocols that can be used for OTA provisioning.

Figure 4:
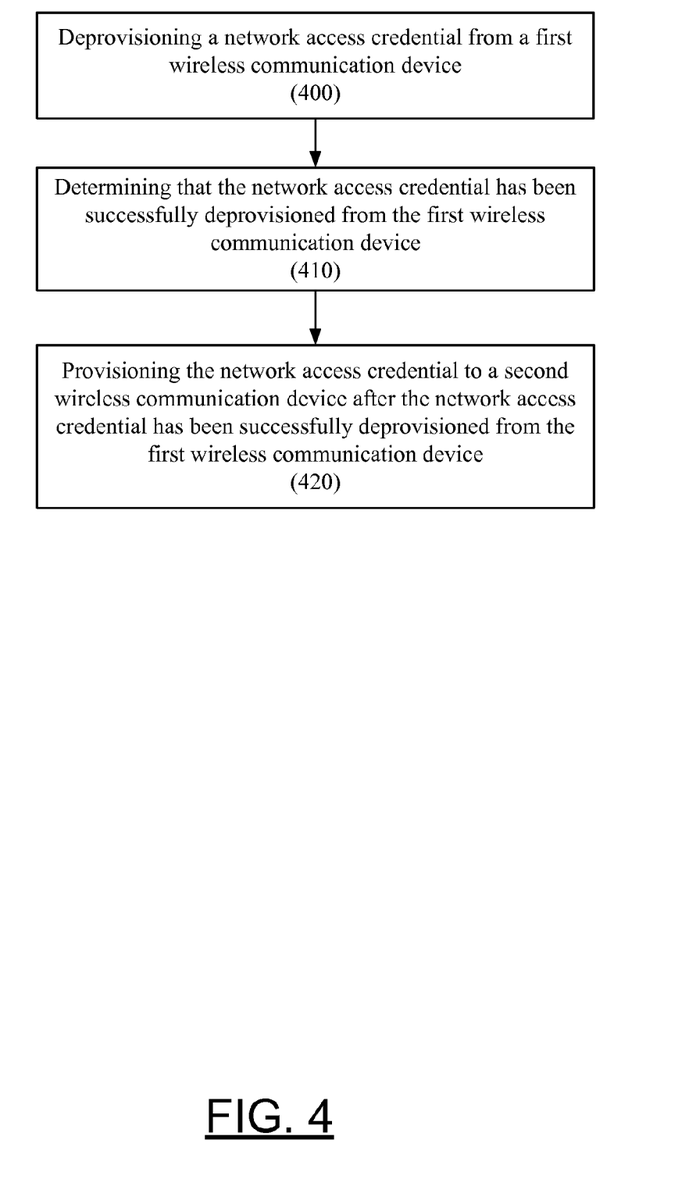
FIG. 4 illustrates a flowchart according to an example method for network access credential migration according to some example embodiments.

FIG. 4 illustrates a flowchart according to an example method for network access credential migration according to some example embodiments. In this regard, FIG. 4 illustrates operations that can be performed by the provisioning entity 106. Operation 400 can include deprovisioning a network access credential from the first wireless communication device 102. Operation 410 can include determining that the network access credential has been successfully deprovisioned from the first wireless communication device 102. Operation 420 can include provisioning the network access credential to the second wireless communication device 104 after the network access credential has been successfully deprovisioned from the first wireless communication device 102. One or more of processing circuitry 210, processor 212, memory 214, communication interface 216, or provisioning module 218 can, for example, provide means for performing operations 400-420.

Figure 5:
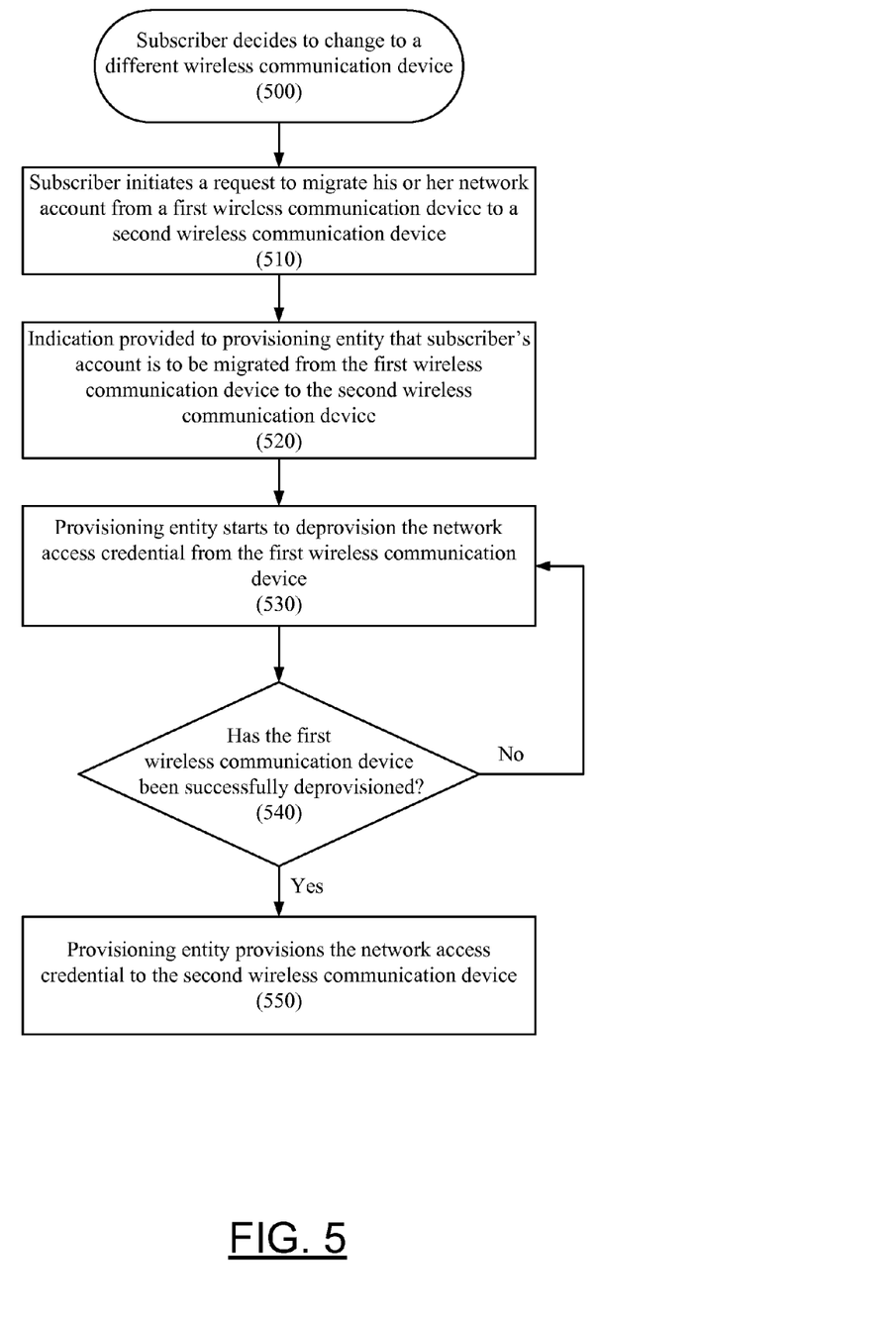
FIG. 5 illustrates a flowchart according to another example method for network access credential migration according to some example embodiments.

FIG. 5 illustrates a flowchart according to another example method for network access credential migration according to some example embodiments. As illustrated by operation 500, a wireless network subscriber can decide to change to a different wireless communication device. At operation 510, the subscriber can initiate a request to migrate his or her network account from the first wireless communication device 102 to the second wireless communication device 104. In response to the subscriber's request, an indication can be provided to the provisioning entity 106 that the subscriber's account is to be migrated from the first wireless communication device 102 to the second wireless communication device 104, at operation 520. Operation 530 can include the provisioning entity 106 deprovisioning the network access credential form the first wireless communication device 530. At operation 540, the provisioning entity 106 can verify that the first wireless communication device 102 has been successfully deprovisioned. If it is determined at operation 540 that the first wireless communication device 102 has not been successfully deprovisioned, the method can return to operation 530. If, however, it is determined at operation 540 that first wireless communication device 102 has been successfully deprovisioned, the method can proceed to operation 550, which can include the provisioning entity 106 provisioning the network access credential to the second wireless communication device 104. One or more of processing circuitry 210, processor 212, memory 214, communication interface 216, or provisioning module 218 can, for example, provide means for performing operations 530-550.

In some example embodiments, the provisioning module 218 can be further configured to provision the first wireless communication device 102 with a predefined credential after the network access credential has been successfully deprovisioned from the first wireless communication device 102. The predefined credential can be a credential that is recognizable by the network access module 318 and that configures the first wireless communication device 102 to not attempt connection to the wireless network that the network access credential is used to access. Thus, for example, in embodiments in which the network access credential deprovisioned from the first wireless communication device 102 is an access credential for a cellular network, the predefined credential can configure the first wireless communication device 102 to not attempt registration to, or otherwise attempt connection to the cellular network. However, the first wireless communication device 102 can still be used for other purposes when provisioned with the predefined credential. For example, the wireless communication device 102 of some such example embodiments can still connect to a second wireless network, such as by way of non-limiting example, a WLAN, when provisioned with the predefined credential.

The predefined credential can be any credential that can be provisioned in place of the deprovisioned network access credential that can be recognized by the network access module 318 to configure the first wireless communication device 102 to bar connection to the wireless network associated with the deprovisioned network access credential. For example, in some example embodiments in which the deprovisioned network access credential is used to access a cellular network and the predefined credential bars connection to the cellular network, the predefined credential can be one of a predefined IMSI or a predefined IMSI prefix. The predefined credential can be different from a factory default credential that can be implemented on the first wireless communication device 102 by a manufacturer, network operator, and/or other entity when the first wireless communication device 102 is in a pre-provisioned state prior to purchase and activation.

In some example embodiments, the default credential can be provisioned to the first wireless communication device 102 via an OTA interface. In this regard, for example, OTA management techniques can be used for provisioning the default credential. By way of non-limiting example, provisioning of the default credential can be performed using OMADM, OTASP, BIP, and/or other protocols that can be used for OTA provisioning.

Figure 6:
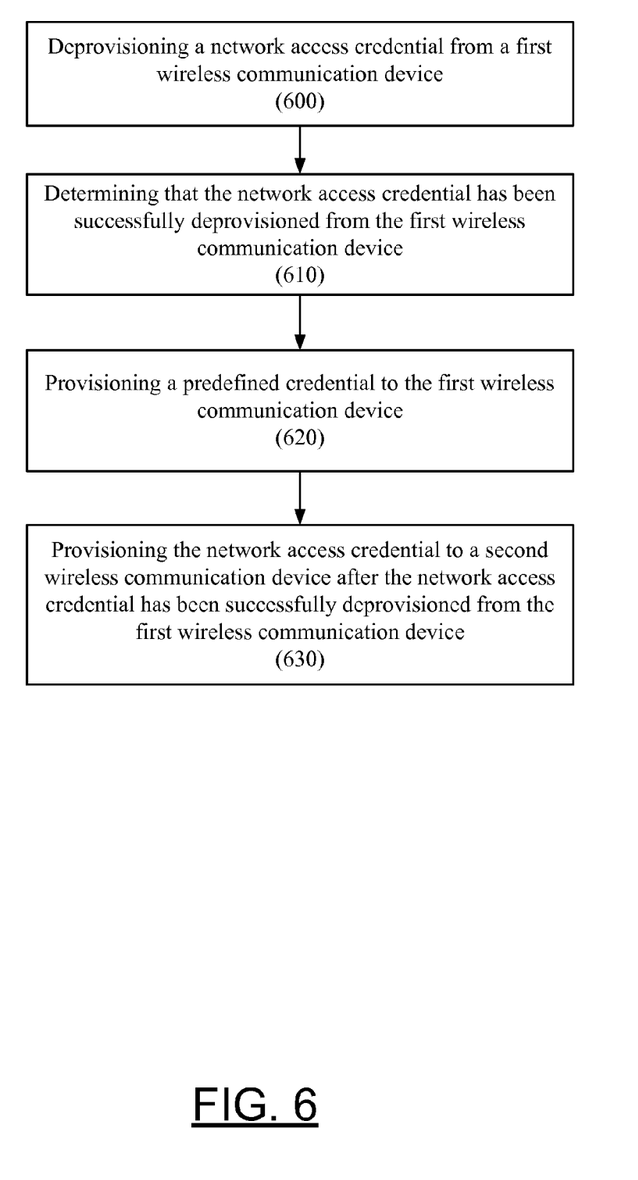
FIG. 6 illustrates a flowchart according to a further example method for network access credential migration according to some example embodiments.

FIG. 6 illustrates a flowchart according to a further example method for network access credential migration according to some example embodiments. In this regard, FIG. 6 illustrates operations that can be performed by the provisioning entity 106. Operation 600 can include deprovisioning a network access credential from the first wireless communication device 102. Operation 610 can include determining that the network access credential has been successfully deprovisioned from the first wireless communication device 102. Operation 620 can include provisioning a predefined credential to the first wireless communication device 102. The predefined credential can configure the first wireless communication device 102 to not attempt to connect to the wireless network which the deprovisioned network access credential is used to access. Operation 630 can include provisioning the network access credential to the second wireless communication device 104 after the network access credential has been successfully deprovisioned from the first wireless communication device 102. It will be appreciated that the ordering of operation 620 and 630 can be reversed in some embodiments. Additionally or alternatively, operations 620 and 630 can be performed at least partially concurrently in some example embodiments. One or more of processing circuitry 210, processor 212, memory 214, communication interface 216, or provisioning module 218 can, for example, provide means for performing operations 600-630.

Figure 7:
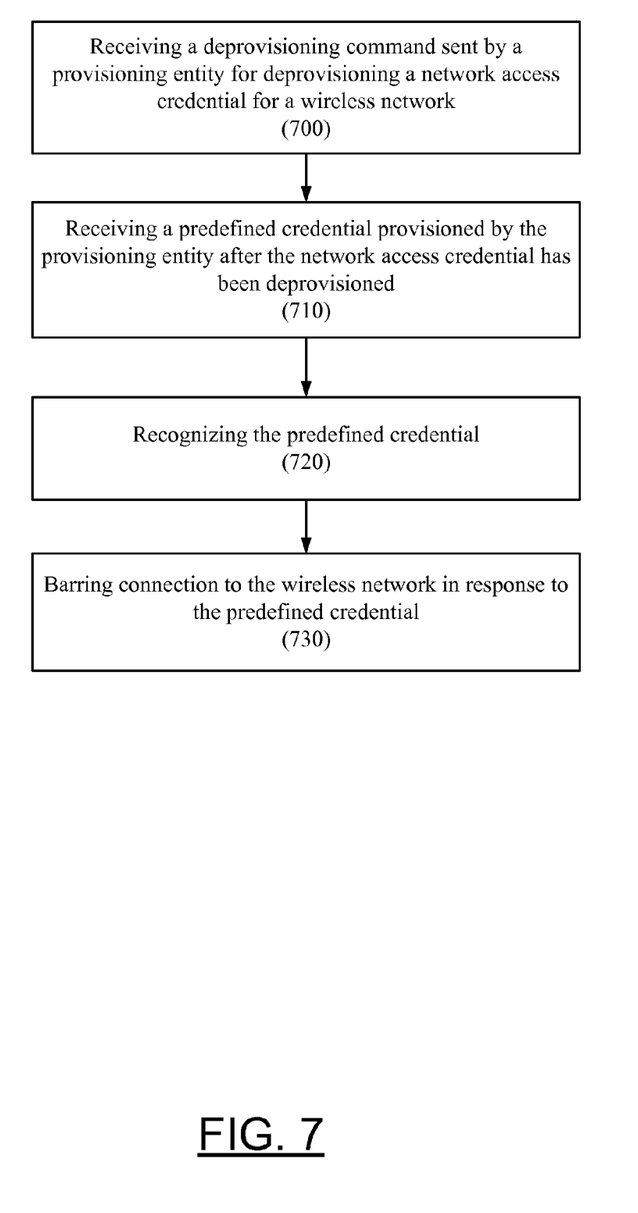
FIG. 7 illustrates a flowchart according to an example method for enabling continued use of a wireless communication device following deprovisioning of the wireless communication device according to some example embodiments.

FIG. 7 illustrates a flowchart according to an example method for enabling continued use of a wireless communication device following deprovisioning of the wireless communication device according to some example embodiments. In this regard, FIG. 7 illustrates operations that can be performed by the first wireless communication device 102. Operation 700 can include receiving a deprovisioning command sent by the provisioning entity 106 for deprovisioning a network access credential for a wireless network. The network access credential can be deprovisioned from the first wireless communication device 102 based at least in part on the deprovisioning command. Operation 710 can include receiving a predefined credential provisioned by the provisioning entity after the network access credential has been deprovisioned from the first wireless communication device 102. One or more of processing circuitry 310, processor 312, memory 314, communication interface 316, network access module 318, or network access credential storage 320 can, for example, provide means for performing operations 700 and 710. Operation 720 can include recognizing the predefined credential. One or more of processing circuitry 310, processor 312, memory 314, network access module 318, or network access credential storage 320 can, for example, provide means for performing operation 720. Operation 730 can include barring connection to the wireless network which the deprovisioned network access credential is used to access in response to the predefined credential. One or more of processing circuitry 310, processor 312, memory 314, communication interface 316, network access module 318, or network access credential storage 320 can, for example, provide means for performing operation 730.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for migrating a network access credential for a wireless network from a first wireless communication device to a second wireless communication device, the method comprising:
   deprovisioning the network access credential from a subscriber identity module (SIM) of the first wireless communication device;
   determining, by a processor, that the network access credential has been successfully deprovisioned from the SIM of the first wireless communication device; and
   provisioning the network access credential to a SIM of the second wireless communication device after the network access credential has been successfully deprovisioned from the SIM of the first wireless communication device, such that the network access credential is unavailable for use at the first wireless communication device before the network access credential is provisioned to the second wireless communication device.

2. The method of claim 1, wherein deprovisioning the network access credential from the SIM of the first wireless communication device comprises rendering the network access credential unreadable by the first wireless communication device.

3. The method of claim 1, wherein:
   deprovisioning the network access credential comprises deprovisioning the network access credential from the SIM of the first wireless communication device via an over-the-air (OTA) interface with the first wireless communication device; and
   provisioning the network access credential comprises provisioning the network access credential to the SIM of the second wireless communication device via an OTA interface with the second wireless communication device.

4. The method of claim 1, further comprising receiving, at a provisioning entity, a request to migrate the network access credential from the first wireless communication device to the second wireless communication device, wherein deprovisioning the network access credential from the SIM of the first wireless communication device and provisioning the network access credential to the SIM of the second wireless communication device are performed by the provisioning entity in response to the request.

5. The method of claim 4, wherein the provisioning entity comprises one or more of an Over-the-Air Service Provisioning (OTASP) entity, an Over-the-Air Parameter Administration (OTAPA) entity, or an Over-the-Air (OTA) Subscriber Identity Module (SIM) provisioning entity.

6. The method of claim 1, wherein the wireless network comprises a cellular network.

7. The method of claim 6, further comprising provisioning the first wireless communication device with a predefined credential that configures the first wireless communication device to not attempt to connect to the cellular network after the network access credential has been deprovisioned from the SIM of the first wireless communication device.

8. The method of claim 1, wherein the network access credential comprises one or more of an International Mobile Subscriber Identity (IMSI), a Mobile Subscription Identification Number (MSIN), a Mobile Identification Number (MIN), a Mobile Directory Number (MDN), a network authentication key, a Subscriber Identity Module (SIM) application, or a Universal Subscriber Identity Module (USIM) application.

9. An apparatus that is associated with a provisioning entity, and comprising processing circuitry configured to cause the apparatus to:
receive a request to migrate a network access credential for a wireless network from a first wireless communication device to a second wireless communication device; and
in response to receiving the request to migrate the network access credential:
deprovision the network access credential from the first wireless communication device;
determine that the network access credential has been successfully deprovisioned from the first wireless communication device; and
provision the network access credential to the second wireless communication device after the network access credential has been successfully deprovisioned from the first wireless communication device, such that the network access credential is migrated from the first wireless communication device to the second wireless communication device,
wherein the network access credential is unavailable for use at the first wireless communication device before the network access credential is provisioned to the second wireless communication device.

10. The apparatus of claim 9, wherein the processing circuitry is further configured to cause the apparatus to deprovision the network access credential from the first wireless communication device at least in part by rendering the network access credential unreadable by the first wireless communication device.

11. The apparatus of claim 9, wherein the processing circuitry is further configured to cause the apparatus to:
deprovision the network access credential from the first wireless communication device at least in part by deprovisioning the network access credential via an over-the-air (OTA) interface with the first wireless communication device; and
provision the network access credential at least in part by provisioning the network access credential to the second wireless communication device via an OTA interface with the second wireless communication device.

12. The apparatus of claim 9, wherein the processing circuitry is further configured to cause the apparatus to provision the first wireless communication device with a predefined credential that configures the first wireless communication device to not attempt to connect to the wireless network after the network access credential has been deprovisioned from the first wireless communication device.

13. The apparatus of claim 9, wherein the wireless network comprises a cellular network.

14. A non-transitory computer-readable storage medium storing executable instructions that, when executed by one or more processors, causes an apparatus to:
deprovision a network access credential for a wireless network from a first wireless communication device;
provision the first wireless communication device with a predefined credential that configures the first wireless communication device to not attempt to connect to the cellular network after the network access credential has been deprovisioned from the first wireless communication device;
determine that the network access credential has been successfully deprovisioned from the first wireless communication device; and
provision the network access credential to a second wireless communication device after the network access credential has been successfully deprovisioned from the first wireless communication device so that the network access credential is migrated from the first wireless communication device to the second wireless communication device
wherein the network access credential is unavailable for use at the first wireless communication device before the network access credential is provisioned to the second wireless communication device.

15. The non-transitory computer-readable storage medium of claim 14, wherein the deprovisioning the network access credential from the first wireless communication device further comprises rendering the network access credential unreadable by the first wireless communication device.

16. A wireless communication device comprising:
at least one transceiver configurable to communicate data via a cellular network; and
processing circuitry coupled to the at least one transceiver, wherein the processing circuitry is configured to cause the wireless communication device to:
receive a deprovisioning command from a provisioning entity for migrating a network access credential for the cellular network from the wireless communication device to a second wireless communication device;
deprovision the network access credential from the wireless communication device based at least in part on the deprovisioning command, such that the network access credential is unavailable for use at the wireless communication device after the deprovisioning;
receive a predefined credential from the provisioning entity after the network access credential has been deprovisioned from the wireless communication device;
recognize the predefined credential;
in response to recognizing the predefined credential, prevent the wireless communication device from connecting to the cellular network; and communicate via a wireless local area network (WLAN) after the wireless communication device recognizes the predefined credential.

17. The wireless communication device of claim 16, wherein the predefined credential comprises one of a predefined International Mobile Subscriber Identity (IMSI) or a predefined IMSI prefix.

18. The wireless communication device of claim 16, wherein the processing circuitry is further configured to cause the wireless communication device to receive the deprovisioning command and the predefined credential via an over-the-air (OTA) interface with the wireless communication device.

19. The wireless communication device of claim 16, wherein the provisioning entity comprises one or more of an Over-the-Air Service Provisioning (OTASP) entity, an Over-the-Air Parameter Administration (OTAPA) entity, or an Over-the-Air (OTA) Subscriber Identity Module (SIM) provisioning entity.

* * * * *